United States Patent [19]
Lanning, II

[11] Patent Number: 5,341,835
[45] Date of Patent: Aug. 30, 1994

[54] LUBRICATION SYSTEM FOR VALVE SEAT OF A GATE VALVE

[75] Inventor: William W. Lanning, II, Sugar Land, Tex.

[73] Assignee: Foster Valve Corporation, Houston, Tex.

[21] Appl. No.: 989,619

[22] Filed: Dec. 14, 1992

[51] Int. Cl.⁵ .................................... F16K 3/36
[52] U.S. Cl. .................... 137/246.22; 251/328
[58] Field of Search ............... 137/246.12, 246.22; 251/328, 332

[56] References Cited

U.S. PATENT DOCUMENTS

| Re. 29,299 | 7/1977 | Estes et al. | 137/246.22 |
|---|---|---|---|
| 2,951,497 | 9/1960 | Laurent | 137/246.13 |
| 2,957,492 | 10/1960 | Volpin | 137/246.12 |
| 3,078,865 | 2/1963 | Estes et al. | 137/246.22 |
| 3,095,004 | 6/1963 | Jackson, Jr. et al. | 137/246.11 |
| 3,135,285 | 6/1964 | Volpin | 137/246.12 |
| 3,190,302 | 6/1965 | Volpin | 137/246.12 |
| 3,215,157 | 10/1965 | Anderson et al. | 137/246 |
| 3,253,609 | 5/1966 | Volpin | 137/246.12 |
| 3,348,567 | 10/1967 | Volpin | 137/246.12 |
| 3,349,789 | 10/1967 | Crain et al. | 137/246.22 |
| 3,412,748 | 11/1968 | Volpin | 137/246.12 |
| 3,504,885 | 4/1970 | Hulsey | 251/328 X |
| 3,538,938 | 11/1970 | Volpin | 137/246.12 |
| 3,696,831 | 10/1972 | Fowler et al. | 137/246.12 |
| 3,752,178 | 8/1973 | Grove et al. | 251/328 X |
| 3,765,440 | 10/1973 | Grove | 137/246.22 |
| 3,765,647 | 10/1973 | Grove et al. | 251/328 X |
| 3,916,940 | 11/1975 | Allen | 137/340 |
| 3,990,465 | 11/1976 | Allen | 137/72 |
| 4,029,294 | 6/1977 | McCaskill et al. | 137/246.12 |
| 4,095,612 | 6/1978 | Hardcastle | 137/246.22 |
| 4,136,710 | 1/1979 | Bond | 137/246.22 |
| 4,137,936 | 2/1979 | Sekimoto et al. | 137/246.22 |
| 4,318,422 | 3/1982 | Nakanishi et al. | 137/246 |
| 4,340,204 | 7/1982 | Herd | 251/355 |
| 4,971,098 | 11/1990 | Stroud | 137/246.12 |
| 5,090,661 | 2/1992 | Parks, Jr. et al. | 251/172 |

Primary Examiner—Stephen M. Hepperle
Attorney, Agent, or Firm—Edgar A. Zarins; Malcolm L. Sutherland

[57] ABSTRACT

A lubrication system for the block and bleed valve seat of a gate valve. Lubrication is provided to the seat through tubing which communicates with the exterior of the gate valve to supply the lubricant and the interior channels of the valve seat. Seals in the valve seat maintain the lubricant within the interior channels of the seat. The lubrication system allows the user to test each seat for integrity without exposing the entire valve to atmosphere by increasing lubricant pressure through the valve seat.

11 Claims, 3 Drawing Sheets

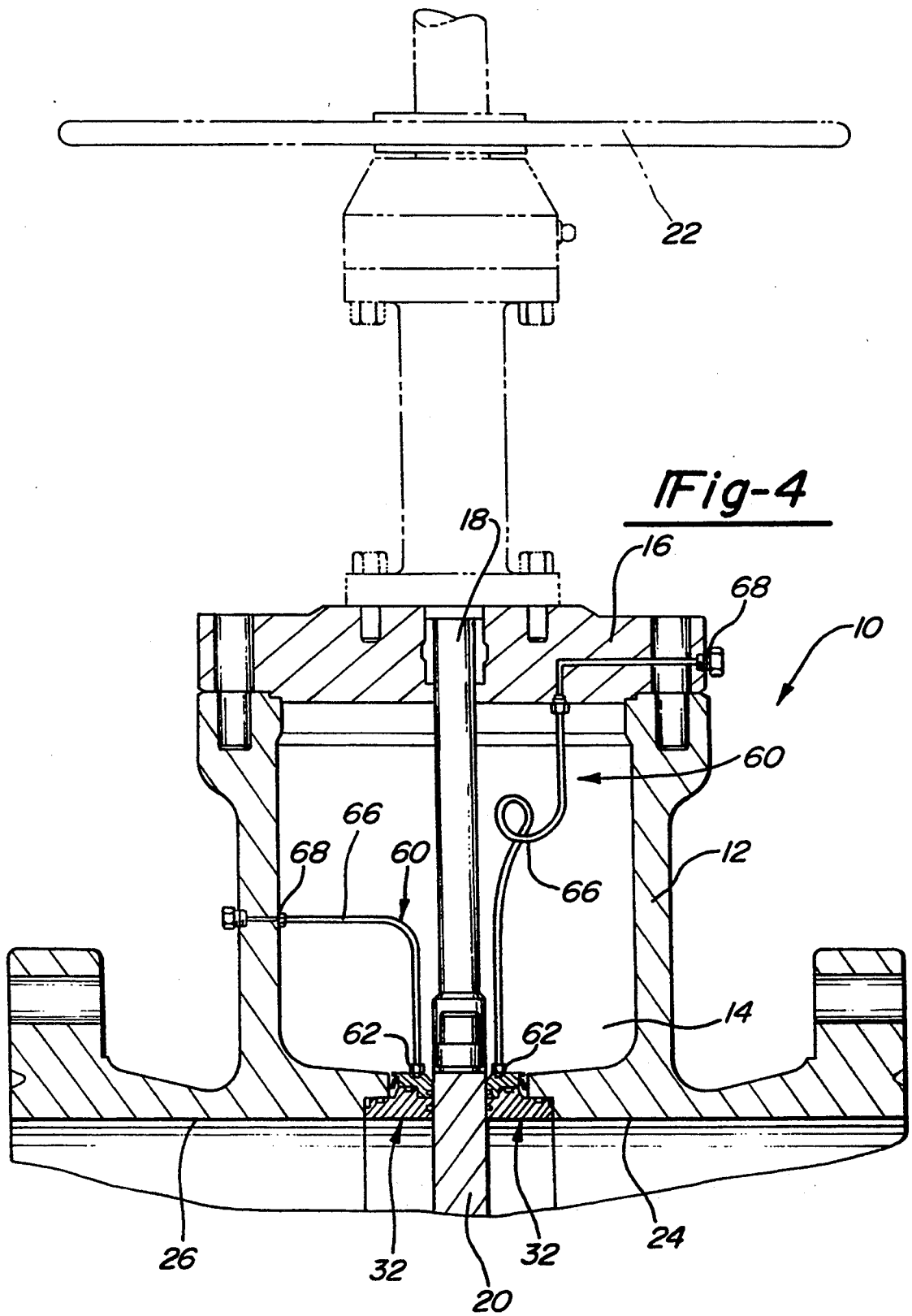

LUBRICATION SYSTEM FOR VALVE SEAT OF A GATE VALVE

BACKGROUND OF THE INVENTION

I. Field of the Invention

This invention relates to a gate valve and, in particular, to a lubricated seat within the gate valve which enhances the sealing properties of the seat while facilitating pressure testing of the seal.

II. Description of the Prior Art

Gate valves have been commonly used for many years and have been employed in a variety of services such as in the oil and gas services of the petroleum industry. Such valves are designed for service involving pressures of several thousand pounds per square inch and must be capable of closing off flow through the conduit associated with the valve. Typical gate valves generally consist of a valve body having inlet and outlet conduits with a valve chamber therebetween. A gate having an opening therethrough is disposed in a valve seat mounted within the chamber and the gate is mounted on a stem. The stem reciprocates within the chamber for moving the gate between a closed position in which flow is blocked and an open position in which flow is through the gate opening. A gate seat seals flow past the gate by engaging the gate. Typical of such valve seats are block and bleed seals which feature upstream and downstream primary and secondary seals to provide greater sealing capacity under extreme fluid pressures.

The prior known block and bleed seals are mounted within the gate valve and dependent upon the lubricating properties provided by the fluid environment. Such dependence can result in unanticipated wear and eventual failure of the seat. In the past users have regularly tested the valve seats by blowing the entire valve contents out to atmosphere to ensure seat integrity. A lubrication system associated with the valve seat would provide a continuous supply of lubricant to the valve seat.

SUMMARY OF THE PRESENT INVENTION

The present invention overcomes the disadvantages of the prior known gate valves by providing a block and bleed seat, with primary and secondary seals, which incorporates a lubrication system for continuous supply of lubricant and the ability of test seat integrity.

The present invention includes a gate valve comprising a valve body having a valve chamber and a pair of flow passages through the valve body aligned at opposite sides of the valve chamber. The valve chamber has a recess around the inner ends of each of the flow passages with a seal seat member disposed in each recess. Each ring-shaped seat member is disposed in the recess around the inner end of the flow passage adjoining the gate of the valve. In a preferred embodiment of the present invention, the seat member comprises primary and secondary seals which create the block and bleed feature of the invention. The primary seal seat member and secondary seal seat member each slide within the recess. Seal means are supported by the ring-shaped primary and secondary seat members at the end portions thereof facing the gate and spring means are provided for each seat member to bias the seat members to bear against the gate. The construction of these components is such that, when the gate is closed, the fluid pressure in the conduit energizes the primary seal. If the primary seal should leak at the gate, this fluid pressure will then energize the secondary seal. If the pressure in the valve body should exceed the pressure in the conduit, both the primary and secondary seals will open to permit the pressure in the valve body to be equalized with the pressure in the conduit. Accordingly, the arrangement of the seals provides the necessary block and bleed feature for pressure equalization.

In order to lubricate the seal seat while also providing a means for testing the integrity of the seals, the present invention incorporates a lubrication supply which communicates between the exterior of the valve and both the downstream and upstream seats. A fitting mounted to the secondary seal member communicates with the passageway formed between the seal members to supply lubricant to the interior of the valve seat. This lubricant passageway is also used to test the integrity of the seals by interjecting lubricant under pressure to affect the primary and secondary seals and test the block and bleed function. As an additional advantage, the lubricant pressure may be utilized to intentionally initiate the bleed function for equalization within the valve.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 4 is a cross-sectional perspective of the valve body illustrating the lubrication system of the present invention.

DETAILED DESCRIPTION OF A PREFERRED EMBODIMENT OF THE PRESENT INVENTION

Figure 1:
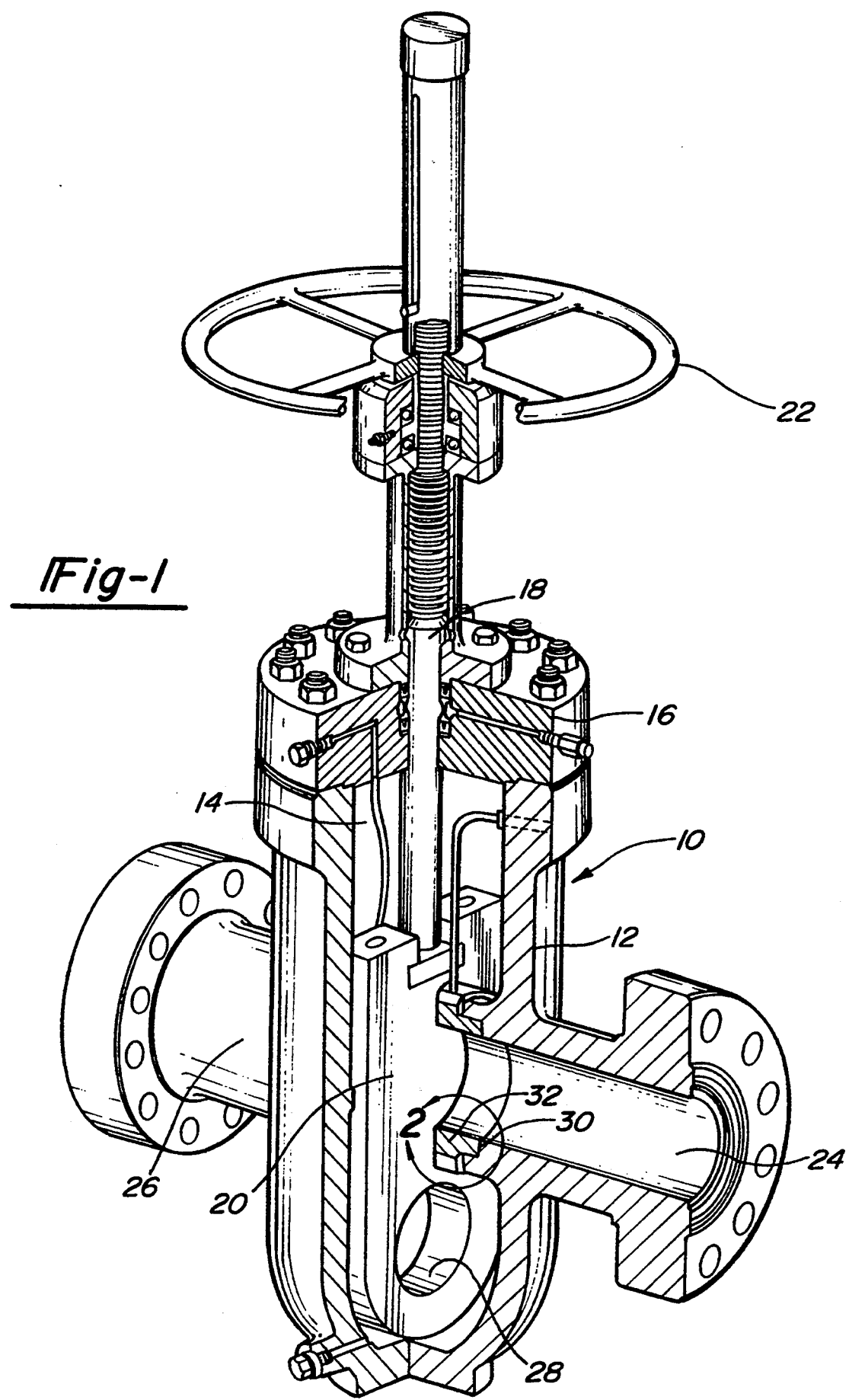
FIG. 1 is a vertical axial cross-section illustrating a preferred embodiment of a gate valve embodying the present invention.

Referring first to FIG. 1, there is shown a gate valve 10 of a rising stem style for controlling the flow of fluids through a conduit. The gate valve 10 includes a valve body 12 which is hollow to form a valve chamber 14 therein. The upper or bonnet portion 16 of the valve 10 may comprise a bonnet of any conventional form which provides a closure of the upper end of the chamber 14 and forms a seal between the valve body 12 and the stem 18. The valve 10 includes a gate element 20 movably disposed within the chamber 14. The gate 20 has a rectangular or slab configuration and is interconnected at the top with the stem 18. The stem 18 is adapted to raise and lower the gate 20 upon selective movement of the stem 14 which is controlled by a wheel nut 22.

The valve body also comprises aligned flow passages 24 and 26 formed on opposite sides of the chamber 14. The gate 20 has a port 28 formed therein which is positioned such that when the gate is moved upwardly to be opened, the port 28 aligns with the passages 24 and 26 to permit the flow of fluids through the valve 10. To close the valve 10, the gate 20 is moved downwardly to block the flow of fluids. A stepped annular recess 30 is formed around each of the flow passages 24,26 to receive a valve seat 32 for sealing the fluid passages 24,26. The valve seats 32 are mounted in close proximity to the gate element 20 to prevent leakage past the gate 20 and preferably include both upstream and downstream seats 32 on opposite sides of the gate 20. In a preferred embodiment of the present invention, the seats 32 are of the block and bleed type which block the flow of fluid for sealing purposes yet bleed built-up pressure differentials in the valve chamber 14.

Figure 2:
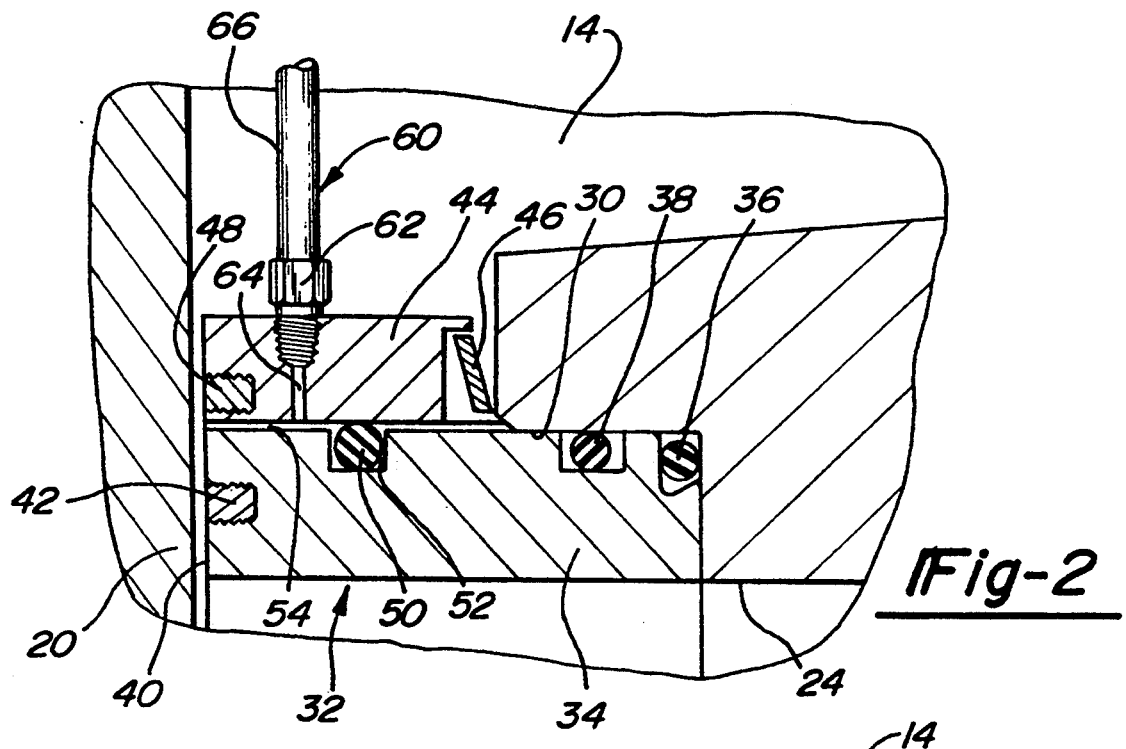
FIG. 2 is a partial cross-section of a first embodiment of the valve seat.
Figure 3:
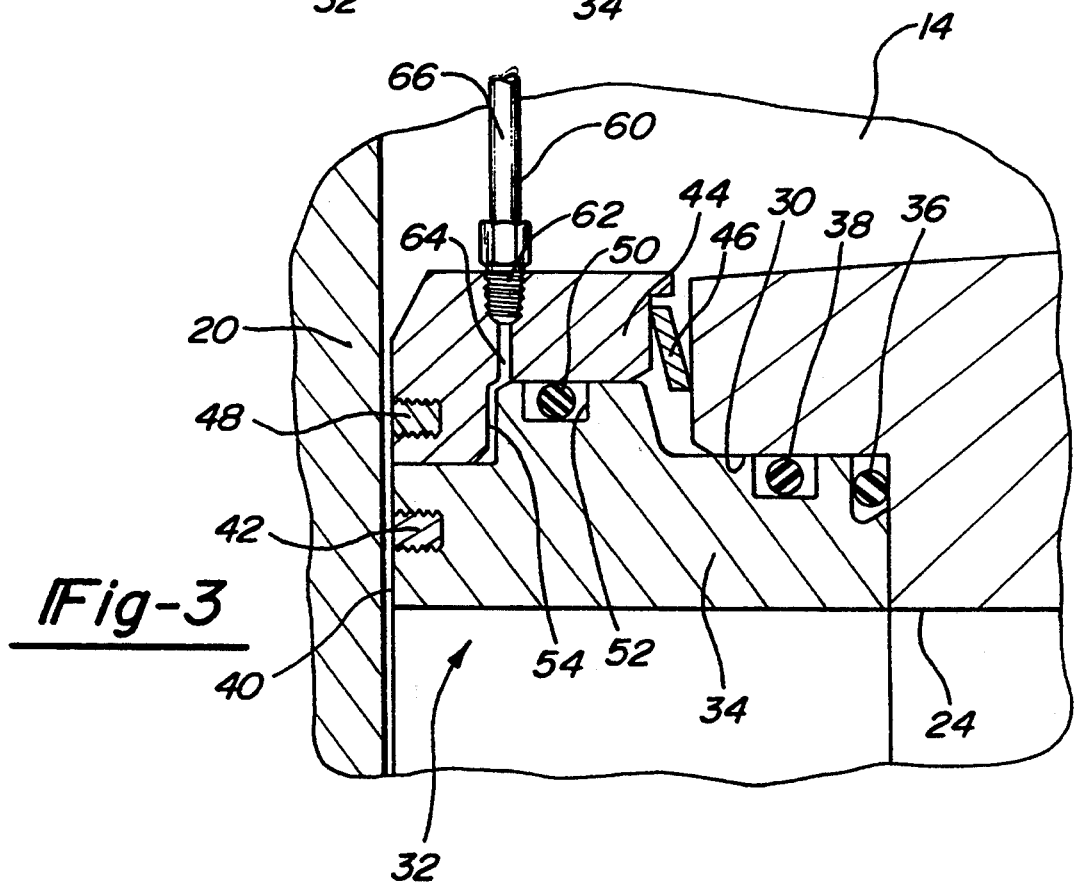
FIG. 3 is a partial cross-section of a second embodiment of the valve seat.

Referring now to FIGS. 2 through 4, there is shown two variations of the block and bleed valve seat 32 and a lubrication system for supplying a lubricant from the exterior of the valve chamber 14 to each of the valve seats 32 of the gate valve 10. The valve seats 32 are slidably mounted within the recesses 32 with close tolerances. A primary seal seat member 34 is biased against gate 20 by O-ring spring seal 36. A seal between the seat member 34 against the valve body is provided by O-ring 38. A seal is provided between the endface 40 of the seat member 24 by seal 42. Preferably, seal 42 is a Teflon ring seal force fitted within a groove cut in endface 40. Ring-shaped secondary seal seat member 44 is designed to fit around the primary seal 34. The secondary seal seat member 44 is biased against gate 20 by spring 46, preferably a Belleville spring. Secondary seal 44 is sealed at gate 20 by seal 48 which is similar to the seal 42. An O-ring seal 50 is provided between the primary seal member 34 and the secondary seal member 44 within groove 52.

When the seat 32 is fully energized, the O-ring spring 36 biases primary seat 34 against the gate 20 to provide an initial seal against fluid pressure in passageway 24 by ring seal 42 bearing against gate 20. If the primary seal at endface 40 is compromised, e.g. by wear at endface 40, the fluid from line 24 will pass between the primary seal 34 and the gate 20 to the secondary seal 44. Thus, the valve seat 32 blocks or seals against fluid leakage through the use of primary and secondary seals. The valve seat 32 also will bleed or vent excess pressure from the chamber 14 while chamber 14 of the valve body typically will be at or near the pressure of the upstream side of line 24 because it will be filled during opening and closing of the gate 20, under some conditions the pressure in chamber 14 can increase. Frequently, this excess pressure is handled by a relief valve in chamber 14. Venting of chamber 14 into the upstream side of line 24 occurs whenever the pressure in chamber 14 exceeds the line pressure by a predetermined amount. The spring 46 and the forces applied by fluid pressure in chamber 14 are selected so that if the pressure in chamber 14 exceeds the pressure in line 24 by some predetermined amount, the forces applied against the endface of the secondary seal 44 overcome the force of spring 46 and the secondary seal seat member 44 opens away from the gate 20. Similarly, the primary seal seat member 34 is pushed away from the gate 20 to bleed the excess pressure from the chamber 14 to the line 24. Once the pressure equalizes, the seat member 32 will once again move to its sealing position. The principles and operation of the block and bleed valve seat are more fully described in U.S. Pat. No. 5,090,661 which is incorporated herein by reference.

The valve seat 32 of the present invention is provided with a lubrication system 60 which communicates between the exterior of the valve body 12 and the valve seats 32 as best shown in FIG. 4. The lubricated block and bleed valve seat 32 also provides the opportunity to test each seat 32 between the primary seal 34 and the secondary seal 44 without having to blow the valve contents out to atmosphere as is required in a standard valve seat. A nipple 62 is secured to the secondary seal member 44 to communicate with passageway 64 in the seal member 44 and the gap 54 between the seal members 34 and 44. The nipple 62 is connected by hose or tubing 66 to an exterior nipple 68 mounted either in the wall of the valve body 12 or in the bonnet 16. A continuous lubrication supply can be connected to the exterior nipple 68 such that lubricant is fed to the valve seat 32 through the tubing 66. Thus, the valve seat 32 is fully lubricated to reduce wear on the valve seat 32 as a result of movement of the gate 20 thereby prolonging the useful life of the valve seat 32 before replacement. As has been noted, the lubrication system 60 also allows testing the integrity of the valve seat 32. Lubricant is supplied under a predetermined pressure to the gap 54 between the primary and secondary seals through and ultimately to the end faces thereof. If it is determined that a threshold lubricant pressure can be attained before the seals de-energize then the integrity of the valve seat 32 is sound. However, if pressure is released prior to reaching the threshold level, it is an indication that the seal rings 42,48 may be worn requiring replacement of the valve seats.

The foregoing detailed description has been given for clearness of understanding only and no unnecessary limitations should be understood therefrom as some modifications will be obvious to those skilled in the art without departing from the scope and spirit of the appended claims.

What is claimed is:

1. In a gate valve including a valve body having a valve chamber therein and pair of flow passages extending therethrough at opposite sides of the flow chamber, a gate member reciprocally movable within said valve chamber between an open and a closed position, said gate member having a flow port therethrough which is selectively aligned with the flow passages to open said gate valve, and seal means for preventing flow of fluid along the surface of the gate member, said seal means including a primary seal seat member and a secondary seal seat member slidably mounted on said primary seal seat member in proximity to the gate member within a recess formed in said flow passages, the improvement comprising:

a lubrication system communicating between the exterior of the valve body and said seal means to provide a continuous supply of lubricant to said seal means, said secondary seal seat member having a lubricant passageway to which lubricant is supplied directing lubricant between said primary and secondary seal seat members, said lubricant selectively supplied under a predetermined pressure threshold to test the integrity of the primary seal seat member and the secondary seal seat member of the seal means.

2. The improvement as defined in claim 1 wherein said lubrication system includes a supply means extending between said seal means and the exterior of the valve body.

3. The improvement as defined in claim 2 wherein said secondary seal seat member is mounted closely surrounding said primary seal seat member, said lubricant passageway communicating with said supply means of said lubricant system whereby lubricant is supplied to said lubricant passageway and between said primary and secondary seal seat members.

4. The improvement as defined in claim 3 wherein said lubricant passageway of said secondary seal seat member communicates with a gap between said primary and secondary seal members and face surfaces of said primary and secondary seal members such that lubricant is supplied between said seal members and to the face surfaces of said seal members normally in contact with said gate member whereby lubricant can be selectively supplied to said seal means under pressure to test the integrity of said seal means.

5. The improvement as defined in claim 2 wherein said secondary seal seat member is slidably mounted on and closely surrounding said primary seal seat member, said lubricant passageway communication with said supply means of said lubricant system whereby lubricant is supplied to said lubricant passageway and between said primary and secondary seal seat members.

6. The improvement as defined in claim 5 wherein said supply means comprises a flexible tube extending between said first and second connectors.

7. The improvement as defined in claim 4 wherein said primary seal seat member is slidably mounted within an annular recess around the inner end of at least one flow passage adjacent the gate member, said primary seal member incorporating primary seal spring means normally biasing said primary seal seat member toward the gate member.

8. The improvement as defined in claim 7 wherein said secondary seal seat member incorporates secondary seal spring means normally biasing said secondary seal seat member toward the gate member.

9. In a gate valve including a valve body having a valve chamber therein and a pair of flow passages extending therethrough at opposite sides of the flow chamber, a gate member reciprocally movable within said valve chamber between an open and a closed position, said gate member having a flow port therethrough which is selectively aligned with the flow passages to open said gate valve, and seal means for preventing flow of fluid along the surface of the gate member, said seal means including a primary seal seat member and a secondary seat member slidably mounted on said primary seal seat member, said primary and secondary seal seat members independently biased against the gate member, said seal means slidably mounted within an annular recess of the inner end of at least one flow passage adjacent the gate member, the improvement comprising:

a lubrication system communicating between the exterior of the valve body and said seal means to provide a continuous supply of lubricant to said seal means, said lubrication system directing lubricant to a gap between said primary and secondary seal seat members, said lubricant selectively supplied at a predetermined pressure threshold to test the integrity of the primary seal seat member and the secondary seal seat member of the seal means.

10. The improvement as defined in claim 9 wherein said lubricant system includes a supply line extending between a first connector mounted to secondary seal seat member and a second connector mounted to a wall of the valve chamber.

11. The improvement as defined in claim 10 wherein said secondary seal seat member has a lubricant passageway, said first connector mounted to said lubricant passageway, said lubricant passageway communicating with said gap between said primary and secondary seal seat members.

* * * * *